United States Patent [19]

Selleri

[11] 4,339,879
[45] Jul. 20, 1982

[54] METHOD FOR ADJUSTING THE POSITION OF THE PROBES OF A PLUG GAUGE AND RELEVANT PLUG GAUGE

[75] Inventor: Narciso Selleri, Monteveglio, Italy

[73] Assignee: Finike Italiana Marposs, S.p.A., S. Marino di Bentivoglio, Italy

[21] Appl. No.: 171,162

[22] Filed: Jul. 22, 1980

[30] Foreign Application Priority Data

Aug. 3, 1979 [IT] Italy .................................. 3479 A/79

[51] Int. Cl.³ .......................... G01B 5/12; G01B 7/12
[52] U.S. Cl. ................................. 33/178 E; 33/147 K
[58] Field of Search ............ 33/143 L, 147 K, 147 N, 33/178 R, 178 E, 178 B

[56] References Cited

U.S. PATENT DOCUMENTS

| | | | |
|---|---|---|---|
| 2,312,222 | 2/1943 | Tanner | 33/178 R |
| 2,680,912 | 6/1954 | Wylie | 33/178 R |
| 2,842,858 | 7/1958 | Mennesson | 33/178 R |
| 3,808,696 | 5/1974 | Possati | 33/178 E |
| 3,958,338 | 5/1976 | Anichini et al. | 33/178 E |
| 4,077,130 | 3/1978 | Possati | 33/178 E |
| 4,211,014 | 7/1980 | Költgen | 33/178 R |

FOREIGN PATENT DOCUMENTS 2038001 7/1980 United Kingdom ............. 33/178 R

Primary Examiner—Richard R. Stearns
Attorney, Agent, or Firm—Stevens, Davis, Miller & Mosher

[57] ABSTRACT

A method for adjusting the position of the probes of a plug gauge having one or more plugs fixed to a support. The plugs are coaxially fixed to the support with great precision and subsequently the position of the probes is adjusted taking the plugs as references.

A plug gauge for actuating the method comprises measuring heads adjustably fixed to the support and annular plugs having limited heights for permitting the accessibility of the measuring heads.

19 Claims, 1 Drawing Figure

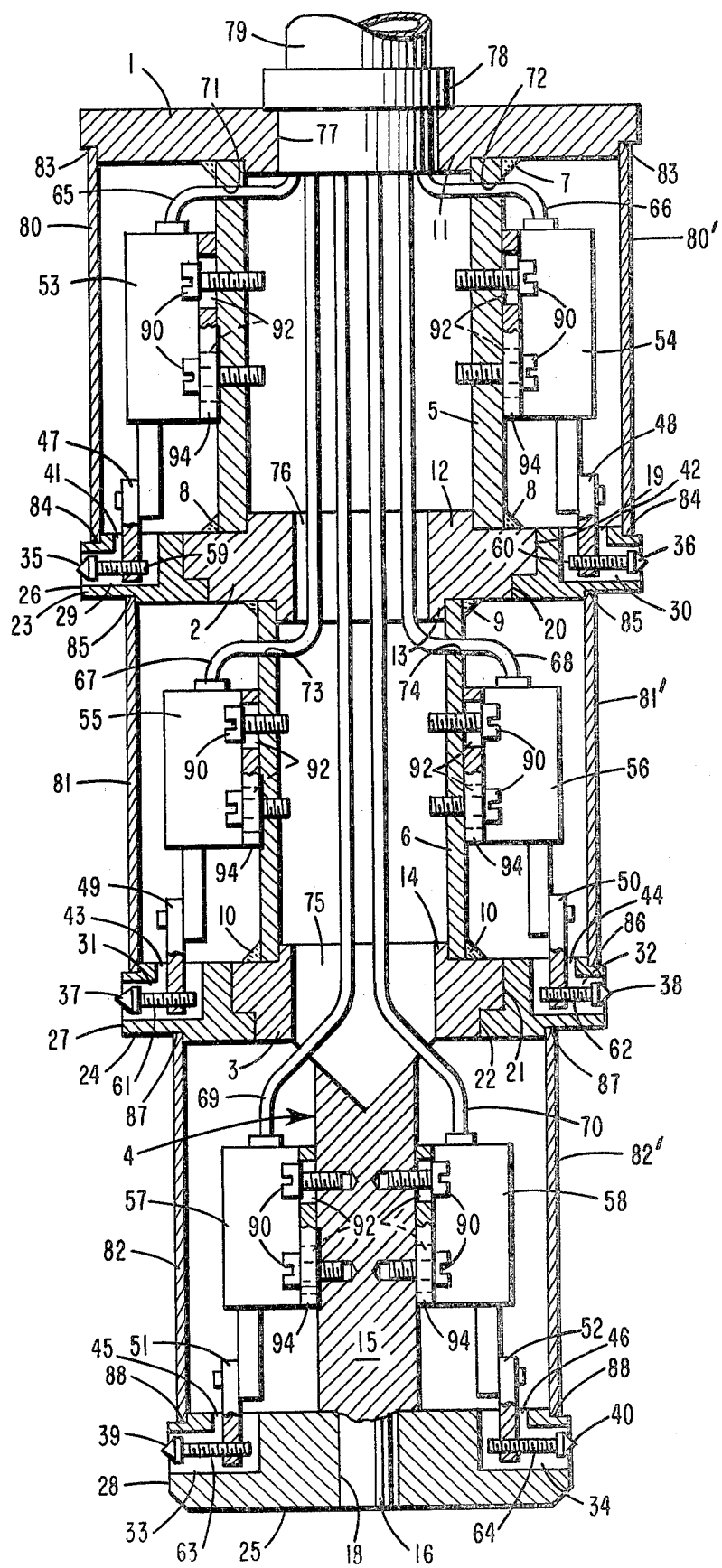

METHOD FOR ADJUSTING THE POSITION OF THE PROBES OF A PLUG GAUGE AND RELEVANT PLUG GAUGE

The present invention relates to a method for adjusting the position of the probes of a plug gauge with a support adapted to define a geometrical axis of the plug gauge; a protection plug adapted to be fixed to the support; and measuring heads adapted to be fixed to the support, the measuring heads including said probes and means for adjusting the rest position of the probes with respect to the support.

The invention also relates to a plug gauge for actuating the method.

Conventional plug gauges include a support—usually integrally made by machining operations on a single piece—to which are fixed measuring heads with movable feelers for contacting the surface of the part to be checked, and a protection nose-piece or plug defining holes for the passage of the feelers.

Both in plug gauges having only a pair of feelers for checking a single diameter and in plug gauges having a plurality of feelers, it is necessary to adjust the position of the feelers in such a way that they, under measuring conditions, are arranged along a diametral direction (and not along a chord) of the piece and at the desired height.

In the conventional gauges the position of the feelers is adjusted before assembling of the nose-pieces, by adjusting the positions of the measuring heads with respect to the support and the positions of the feelers with respect to the bodies of the measuring heads. The adjustment with respect to the height and the alignment of the feelers are then carried out by means of external systems providing spatial references, for example optical collimators and finally zero-setting with respect to the nominal value of the diameter to be checked is carried out by using standard pieces or masters.

Of course, the devices for fixing the measuring heads to the support or supports and the devices connecting the feelers or the arms carrying them in the measuring heads are made so as to permit the adjustments with respect to the height and on planes lying transversally with respect to the gauge axis.

The nose-piece or nose-pieces are mounted after having carried out said adjustments. If subsequently one notices that the position of the feelers is not correct it is necessary to detach the nose-pieces, which bar the accessibility of the measuring heads and of the arms.

Thus, it is evident that the adjustment and the zero-setting of the feelers in these conventional gauges involve long and difficult operations. These operations are particularly burdersome for multiple gauges for performing checkings on transfer machines, or for similar applications, because they must be carried out for all the pairs of feelers before the final assembling of the nose-pieces. The nose-pieces are used, in these gauges, only for protective purposes.

An object of the present invention is to provide a method for adjusting the positions of the feelers in a quick, accurate and inexpensive way.

Another object of the invention is to provide a plug gauge for actuating the adjustment method and which has a limited cost.

The first of said objects and other objects are obtained by a method of the type outlined at the beginning of this description wherein, according to the invention, the plug is fixed to the support in a coaxial position and with great accuracy with respect to said geometrical axis and the desired positions of the feelers with respect to the geometrical axis are then adjusted taking the plug as a reference.

The second of said objects and other objects are achieved by a plug gauge with a support adapted to define a geometrical axis of the plug-gauge; a protection plug adapted to be fixed to the support; and measuring heads adapted to be fixed to the support, the measuring heads including probes adapted to cooperate with the surface of the part to be checked and means for adjusting the rest position of the probes with respect to the support, wherein, according to the invention, said plug has a shape substantially annular, with a limited height, for permitting the accessibility of the measuring heads and the adjustments of the probes with reference to the plug.

The invention will be detailedly described hereinafter with reference to the preferred embodiment illustrated in the annexed drawing, which is given however as a non-limiting example, wherein The single FIGURE shows a vertical sectional view of a plug gauge for transfer machines for checking three different diameters on relevant coaxial cross-sections of a bore.

The plug gauge illustrated includes substantially annular plates 1,2 and a structure 4 with a flange 3, substantially annular, too. Plates 1,2 and flange 3 are connected by rough section tubes 5,6 having square or rectangular horizontal cross-sections. Section tubes 5,6 are joined to plates 1,2 and to flange 3 through weldings 7,8,9,10.

Plates 1,2 and flange 3 have axially projecting parts 11,12,13, 14 which are inserted within the axial hole of section tubes 5,6 for enabling a safe and accurate joining of plates 1,2 to structure 4.

Structure 4 includes, in addition to flange 3, a central body 15, having the shape of a parallelogram with rectangular horizontal cross-section, and a cylindrical stud 16.

Plate 1 couples the plug gauge to an infeed unit, not shown, for inserting the plug gauge into the bore to be checked.

Plate 2, flange 3 and cylindrical stud 16 have coaxial outer surfaces 19 and 20, 21 and 22, and 18, respectively. The concentricity of these surfaces is ensured because the surfaces are machined (after assembling plates 1,2 and structure 4 by means of section tubes 5,6) on the same machine tool, for example a lathe, with a single centering of the assembled set on the machine tool. Therefore the above mentioned elements constitute, after the machining operation, the support of the plug gauge and define the axis of the support and of the gauge.

Substantially annular plugs 23,24,25 are then keyed with a stable fit on plate 2, flange 3 and cylindrical stud 16; these plugs 23,24,25 have external surfaces 26,27,28 accurately machined and with outside diameters slightly smaller than the nominal diameters of the relevant bore sections to be checked. Plugs 23,24,25 have pairs of radially opposite bores 29–34 for the passage of probes or feelers 35–40, respectively, and holes 41–46, having axes parallel to the axis of the plug gauge, for the passage of movable arms 47–52 which connect the feelers to relevant measuring heads 53–58.

The axes defined by the pairs of bores 29-34 are perpendicular to the gauge axis and lie on angularly spaced planes passing through the gauge axis.

The accurate positioning of plugs 23,24,25 with respect to the plug gauge support, with reference to both the axis and the angular position as well as the vertical distances is guaranteed by precise mechanical references, not shown, obtained in the plugs and in the support.

The axes of radial bores 29-34 are angularly spaced with great accuracy in such a way that the same bores 29-34, which have very narrow dimensional tolerances, may constitute spatial references, fixed with respect to the plug-gauge support, for adjusting the positions of the feelers along the vertical direction (height) and the diametral directions.

Feelers 35-40 have threaded stems 59-64 coupled to relevant threaded holes of arms 47-52 for permitting adjustment of the positions of the pairs of feelers along the three axes defined by the pairs of radial bores 29-34.

Measuring heads 53-58 comprise position transducers, not visible, of differential transformer type, and provide measurement electrical signals responsive to the displacements of arms 47-52 caused by the contact of the corresponding feelers 35-40 with the surface of the three sections of the bore to be checked.

Electrical multipolar cables 65-70 provide the electrical power supply to measuring heads 53-58 and send the measurement electrical signals to a processing and indicating unit, per se known and not shown in the FIGURE.

Holes 71,72;73,74 obtained in section tubes 5,6, holes 75,76,77 obtained in structure 4 and in plates 2,1, respectively permit the passage of cables 65-70 of measuring heads 53-58. Cables 65-70 are arranged in the plug gauge mainly within its support and therefore in a protected position.

A cap 78 closes hole 77 of plate 1 and houses a sheath 79 for cables 65-70.

Measuring heads 53-58 and partly arms 47-52 are mechanically protected by envelopes. Each envelope comprises two semicylindrical shells 80,80'; 81,81'; 82,82' having an outside diameter slightly smaller than that of the relevant adjacent plug protecting the feelers of the measuring heads arranged within the envelope. Semicylindrical shells 80,80'; 81,81'; 82,82' abut on steps 83;84,85;86,87;88 formed in plate 1 and plugs 23,24,25 respectively and are connected to the latter by screws, not shown.

The adjustment of the positions of the feelers and the mechanical zero-setting of the plug gauge are carried out as follows.

After having locked plugs 23,24,25 to plate 2, flange 3 and stud 16, measuring heads 53-58 are coupled onto the flat sides of section tubes 5,6 and of central body 15.

This coupling is preferably achieved by means of screw connection devices permitting the adjustment of the positions of the measuring heads 53-58 along a direction parallel to the plug gauge axis and along an angular direction through a single operation for every measuring head. The adjusting means may comprise screws 90 threaded into tubes 5 and 6 and structure 4 through slots 92 in flanges 94 on each measuring head.

After this adjustment operation the connection devices are locked, thus fixing the measuring heads 53,58 in stable positions. Instead of carrying out the adjustment operation on measuring heads 53-58 only, it may be performed, in part or totally, on screw connection devices coupling the arms 47-52 to measuring heads 53-58; the adjustment operation is carried out with the aid of suitable mechanical, electrical or optical centering devices in such a way as to align feelers 35-40 with the centers of radial bores 29-34.

Then, by means of auxiliary tools which can be inserted through bores 29-34 the radial adjustment of the positions of the pairs of feelers 35-40 is carried out, that is the mechanical zero-setting with respect to the nominal values of the relevant diameters to be checked. For this purpose threaded stems 59-64 can be screwed or unscrewed with respect to relevant holes obtained in arms 47-52.

The amount of these radial adjustments may be determined by means of standard rings, or masters, and/or with reference to the outside diameters, of known values, of the relevant plugs 23,24,25.

In order to render stable the axial positioning of stems 59-64, the screws used may be of the known type including resilient friction devices.

Semicylindrical shells 80,80'; 81,81'; 82,82' are mounted only after the vertical adjustment and the alignment of feelers 35-40, or after the radial adjustment, and therefore before mounting the shells there is a very good accessibility with respect to measuring heads 53-58, the relevant connection devices to section tubes 5,6 and central body 15, and the connection devices for arms 47-52, because plugs 23,24,25 have an annular shape with a height development limited to the zones adjacent to feelers 35-40.

Thus it is evident that the adjustment and the zero-setting of the feelers 35-40 of the plug gauges are, due to the described method, particularly simple, quick and exact.

Measuring heads 53-58 are preferably sealed, for assuring a better protection of the elements contained within the same heads.

In case a defective operation of a measuring head 53-58 is noticed when the plug-gauge is being used, it is sufficient to remove one of the shells 80,80'; 81,81'; 82,82'0 of the relevant protection envelope for obtaining the accessibility of the defective measuring head. After repair or replacement of the defective measuring head it is sufficient to adjust the position of the relevant feeler, without any need to act on the other feelers.

The use of interchangeable elements like rough section tubes 5,6, structure 4, plates 1,2 and plugs 23,24,25 permits considerable constructional and operational savings, by reducing the number of the elements to keep in stock and the mechanical machinings.

Moreover, the use of section tubes permits to make plug gauges particularly light, this constituting a considerable advantage, especially for manual plug-gauges. As it is known, the plugs or nose-pieces of manual plug gauges also have centering functions.

Evidently, the plug gauge may be of a type different from that illustrated, for example it may be a manual plug gauge having only two feelers or a plug gauge including feelers adapted to check not only diameters but also axial dimensions and geometrical or shape features through processings of the signals of the measuring heads.

As far as multiple plug gauges are concerned, the number of diameters to be checked, and so that of measuring heads, flanges, plugs, etc., may be higher than that shown in the FIGURE.

It is also evident that the method and the plug gauge described in detail may undergo other changes or variants equivalent from a functional or structural point of view without departing from the spirit of the invention.

What is claimed is:

1. A method for adjusting the positions of the probes of a plug gauge having a support adapted to define a geometrical axis of the plug gauge; a protection plug adapted to be fixed to the support, the plug defining radial holes; and measuring heads adapted to be fixed to the support, the measuring heads including said probes and means for adjusting the rest position of the probes with respect to the support, the probes being arranged in part within said plug and passing through said holes, comprising the steps of fixing the plug to the support in a coaxial position with said geometrical axis, and of subsequently adjusting the positions of the probes with respect to the support taking said holes as spatial references.

2. The method for adjusting and positions of the probes of a plug gauge according to claim 1, wherein the radial holes of the plug are arranged along at least a diametral line perpendicular to and passing through said geometrical axis and wherein the step of adjusting the position of the probes with respect to said support comprises aligning the probes along said diametral line.

3. The method according to claim 2, wherein said adjusting step further comprises adjusting the positions of the probes along the direction of said geometrical axis.

4. The method according to claim 3, wherein the step of aligning and adjusting the probes is carried out by a single operation.

5. The method according to claim 1 or claim 2, wherein the plug defines an external surface having a pre-set diameter, including the further step of adjusting the radial positions of the probes with reference to said diameter of the plug.

6. A plug gauge comprising a support adapted to define a geometrical axis of the plug gauge; a protection plug adapted to be fixed to the support; and measuring heads adapted to be fixed to the support, the measuring heads including probes adapted to cooperate with the surface of the part to be checked and adjusting means for adjusting the rest position of the probes with respect to the support, and wherein said plug has a shape substantially annular, with a limited height with respect to the height of the gauge, for protecting the probes while permitting the accessibility of the measuring heads, the plug defining radial openings for the passage of the probes, said radial openings providing spatial references for adjusting the probes with respect to the support.

7. The plug gauge according to claim 6, wherein said support includes a first element elongated along the direction of said geometrical axis and a second element, substantially annular, connected to the first element, the measuring heads being fixed to the first element, the plug being fixed to the second element.

8. The plug gauge according to claim 7, wherein the measuring heads are fixed to said first element in adjustable positions.

9. The plug gauge according to claim 7, wherein the probes are mounted in the measuring heads through devices permitting adjustment of their rest positions.

10. The plug gauge according to claim 6 or claim 7, further comprising a protection envelope coupled to the support for protecting the measuring heads, the measuring heads being arranged within the envelope.

11. The plug gauge according to claim 10, wherein the protection envelope has a substantially cylindrical shape and includes two shells separately detachable from the support.

12. The plug gauge according to claim 6 or claim 7, wherein said openings of the plug comprise two bores defining an axis perpendicular to said geometrical axis, the two axes lying on a same plane, and wherein each bore is adapted to permit the passage of a relevant probe.

13. The plug gauge according to claim 12, wherein said measuring heads include movable arms and the probes include contact feelers supported by the movable arms, the feelers being coupled to the movable arms through said adjusting means, these adjusting means being adapted to be operated through the bores of the plug.

14. The plug gauge as claimed in claim 6 or claim 7, for checking a plurality of diameters of a bore, comprising a corresponding plurality of pairs of measuring heads and a plurality of plugs, said support including coaxial tubular elements arranged along said geometrical axis for supporting measuring heads, and substantially annular elements, coaxial with the tubular elements, for supporting plugs.

15. The plug gauge according to claim 14, wherein one or more of said substantially annular elements are arranged between adjacent tubular elements.

16. The plug gauge according to claim 14, wherein said tubular elements have flat sides for supporting the relevant measuring heads.

17. The plug gauge according to claim 14, wherein the probes include contact feelers and the measuring heads include electrical transducers and connection cables, said cables passing through the holes defined by the tubular elements and by the annular elements.

18. The plug gauge according to claim 14, comprising envelopes for protecting relevant pairs of measuring heads, said envelopes including bases fixed to relevant plugs and to an end of the support.

19. The plug gauge according to claim 18, wherein the measuring heads are sealed.

* * * * *

UNITED STATES PATENT AND TRADEMARK OFFICE
CERTIFICATE OF CORRECTION

PATENT NO. : 4,339,879
DATED : July 20, 1982
INVENTOR(S) : SELLERI

It is certified that error appears in the above—identified patent and that said Letters Patent is hereby corrected as shown below:

Column 4, line 41 delete "O"
Claim 2, line 1 delete "and" and insert -- the --.

Signed and Sealed this

Twenty-eighth Day of December 1982

[SEAL]

Attest:

GERALD J. MOSSINGHOFF

Attesting Officer   Commissioner of Patents and Trademarks